US009771278B2

(12) United States Patent
Haynes

(10) Patent No.: US 9,771,278 B2
(45) Date of Patent: Sep. 26, 2017

(54) HIGH EFFICIENCY, LARGE SCALE DESALINATION SYSTEM

(71) Applicant: H2O Global LLC, Los Angeles, CA (US)

(72) Inventor: Joel Haynes, Los Angeles, CA (US)

(73) Assignee: H2O GLOBAL LLC, Los Angeles, CA (US)

( * ) Notice: Subject to any disclaimer, the term of this patent is extended or adjusted under 35 U.S.C. 154(b) by 0 days.

(21) Appl. No.: 15/252,050

(22) Filed: Aug. 30, 2016

(65) Prior Publication Data

US 2016/0368784 A1 Dec. 22, 2016

Related U.S. Application Data

(63) Continuation-in-part of application No. 12/902,011, filed on Oct. 11, 2010, now Pat. No. 9,428,403.

(51) Int. Cl.

| | |
|---|---|
| ***C02F 1/12*** | (2006.01) |
| ***C02F 1/04*** | (2006.01) |
| ***B01D 1/18*** | (2006.01) |
| ***B01D 1/30*** | (2006.01) |
| ***B01D 1/00*** | (2006.01) |
| ***B01D 5/00*** | (2006.01) |

(Continued)

(52) U.S. Cl.
CPC .............. *C02F 1/12* (2013.01); *B01D 1/0035* (2013.01); *B01D 1/0094* (2013.01); *B01D 1/18* (2013.01); *B01D 1/28* (2013.01); *B01D 1/305* (2013.01); *B01D 5/006* (2013.01); *C02F 1/042* (2013.01); *C02F 1/14* (2013.01); *C02F 1/06* (2013.01); *C02F 2103/08* (2013.01); *C02F 2303/10* (2013.01)

(58) Field of Classification Search
CPC ... C02F 1/042; C02F 1/06; C02F 1/12; B01D 1/0041; B01D 1/18; B01D 5/00; B01D 5/006
See application file for complete search history.

(56) References Cited

U.S. PATENT DOCUMENTS

| | | | |
|---|---|---|---|
| 3,163,587 | A | 12/1964 | Champe |
| 3,960,668 | A | 6/1976 | Rush |

(Continued)

*Primary Examiner* — Jonathan Miller
(74) *Attorney, Agent, or Firm* — Cislo & Thomas LLP

(57) ABSTRACT

An apparatus and method for the distillation of ocean and brackish water that includes a means for using the ambient temperatures of seawater and air to continually transfer the heat energy, from the outer perimeters of the system, back into the, centrally located, evaporation chamber and insulation for preventing heat from escaping to the atmosphere. The insulation comprises a first and second wall surrounding the basic assemblies of a desalination system in which the space between the first and second wall is under low partial vacuum and is partially filled with an insulation material for structural support. The system provides a feed through means that prevent heat transfer through the structural connections between the first and second walls. The system provides an evaporation system for flash evaporation by atomizing the input contaminated water, preheated by the heat of condensation into very small liquid droplets, which are then sprayed into a stream of hot dry air. The liquid rapidly evaporates leaving behind hot dry solids that is recaptured and used to preheat the input contaminated water.

17 Claims, 12 Drawing Sheets

(51) Int. Cl.

| | |
|---|---|
| ***C02F 1/14*** | (2006.01) |
| ***B01D 1/28*** | (2006.01) |
| *C02F 1/06* | (2006.01) |
| *C02F 103/08* | (2006.01) |

(56) References Cited

U.S. PATENT DOCUMENTS

| | | | | | |
|---|---|---|---|---|---|
| 4,671,856 | A * | 6/1987 | Sears | B01D 1/221 159/24.2 |
| 4,869,067 | A * | 9/1989 | Sears | B01D 1/221 165/138 |
| 5,053,110 | A | 10/1991 | Deutsch | |
| 5,181,991 | A | 1/1993 | Deutsch | |
| 5,207,928 | A | 5/1993 | Lerner | |
| 5,348,622 | A | 9/1994 | Deutsch et al. | |
| 5,729,987 | A | 3/1998 | Miller | |
| 5,772,850 | A | 6/1998 | Morris | |
| 6,254,734 | B1 | 7/2001 | Sephton | |
| 6,299,735 | B1 | 10/2001 | Lumbreras | |
| 6,355,144 | B1 | 3/2002 | Weinstein | |
| 6,699,369 | B1 | 3/2004 | Hartman et al. | |
| 6,932,889 | B1 | 8/2005 | Holcomb | |
| 7,381,310 | B2 * | 6/2008 | Hernandez Hernandez | B01D 1/16 159/43.1 |
| 7,897,019 | B2 | 3/2011 | Akers | |
| 8,444,830 | B2 | 5/2013 | Davey | |
| 8,496,787 | B2 | 7/2013 | Lord | |
| 8,533,972 | B2 | 9/2013 | Hubbard, Jr. et al. | |
| 8,893,496 | B2 | 11/2014 | Ramamurthy | |
| 9,205,349 | B2 * | 12/2015 | Kaminski | B01D 3/02 |
| 9,211,482 | B2 * | 12/2015 | Kaminski | B01D 1/28 |
| 9,428,403 | B2 * | 8/2016 | Haynes | B01D 1/0035 |
| 2008/0283199 | A1 | 11/2008 | Hartman | |
| 2010/0181185 | A1 | 7/2010 | Davey | |
| 2012/0085635 | A1 | 4/2012 | Haynes | |

* cited by examiner

HIGH EFFICIENCY, LARGE SCALE DESALINATION SYSTEM

CROSS REFERENCE TO RELATED APPLICATIONS

This application is a continuation-in-part application of U.S. patent application Ser. No. 12/902,011, filed Oct. 11, 2010, entitled "Large Scale insulated Desalination System," which application is incorporated here in its entirety by this reference.

BACKGROUND

The present invention relates primarily to methods of improving the efficiency, reducing environmental issues, and operational and capital costs, of desalination systems. More particularly, to desalination systems that distill brackish or ocean water.

Fresh water is a scant 2.5% of the total global water supply and 69% of that is represented by permanent snow and glaciers. The remaining 97.5% is saltwater. Since 1940, the amount of fresh water used by humanity has roughly quadrupled as the world population doubled. Given the finite nature of the earth's fresh water resources, such a quadrupling of worldwide water use probably cannot occur again. In many of the regions where the world population is growing most rapidly, the needed fresh water is not available. Desalination of seawater represents the best source of fresh water to satisfy future requirements.

However, present day desalination systems are energy intensive. For example, the newly constructed system in Carlsbad, Calif. is said to be the most energy efficient of any large scale desalination system in the USA at 3.6 kilowatts per cubic meter of water. It also desalinates only fifty percent of intake water, returning the remaining concentrated brine to the ocean. Returning concentrated brine solution to the ocean presents a continually escalating environmental hazard to the ocean ecosystem.

For desalination to be the source of fresh water to meet future requirements, it must be cost competitive with ground water sources and environmentally friendly.

The true cost of household fresh water is difficult to assess due to government subsidies, transfer cost and variations in local energy and labor cost. However, it is estimated that energy requirements for desalination should be in the range of about 2 to 2.5 kilowatts per cubic meter of fresh water to be competitive.

Another environmental issue involves seawater intakes that can only be addressed in connection with site location of the desalination system. However, there are intake methods such as subsurface, sand filters, subterranean, and beach wells that can solve most environment intake problems.

Throughout the world today, all desalination facilities combined produce about 38 million cubic meters (approx. 10 billion gallons) of desalinated water per day. These facilities basically utilize two technologies, membrane filter processes and thermal distillation processes. Of these processes, reverse osmosis (membrane filter process) and multistage flash distillation (thermal distillation process), make up and share about 80% of the world market.

Reverse osmosis uses high pressure pumps to force fresh water through a semi-permeable membrane, leaving the dissolved solids behind. This process requires seawater pretreatment, an electrical power source, chemical post-treatment and annual membrane replacement.

Multi-stage flash (MSF) involves introducing heated seawater into multiple, reduced pressure chambers that cause a portion of the water to instantly flash (boil) into water vapor. The vapor is then condensed into distilled water. This process requires an energy source for heating the seawater as well as control functions.

Both technologies are energy intensive, and both convert about 50% of the input seawater into fresh drinkable water, discharging the remaining brine solution back into the ocean, which results in an ever increasing environmental problem.

The past decade has seen a huge increase in research and development in desalination projects around the world utilizing improved technologies, resulting in improved efficiency and reduced capital costs, such as low temperature flash desalination. Numerous patents have been granted disclosing designs that improve efficiency. A large number of these patents involve the "flash desalination" of water at low, near ambient temperatures in an effort to reduce energy requirements. Although seawater can be evaporated at low temperatures by decreasing pressure (partial vacuum), the decreasing temperature results in an exponential decrease in the Vapor Saturation Density. Therefore, large quantities of vapor must be transferred to recover significant quantities of distilled liquid, which places much higher energy and costs requirements upon the system.

For example, at 40° C. (104° F.), saturated vapor density is 51.1 grams per cubic meter (0.00319 pounds per cubic feet). At 110° C. (230° F.), saturated vapor density is 850 grams per cubic meter (0.05306 pounds per cubic feet). The result is that a system that is to produce 100 cubic meters (26,417 gal) of fresh water per day at a temperature of 40° C. must transfer vapor at a rate of more than 1359 cubic meters per min, whereas at 110° C. it would only need to transfer 81.7 cubic meters per min.

Despite the inventions, research, developments and improvements, present day seawater desalination processes continue to be an intensive fossil energy consumer that escalates desalination cost from to 5 times greater than ground water supplies.

The desalination industry has publicized that the minimum energy requirement to desalinate 3.5% seawater is 860 watts per cubic meter. A true statement, but somewhat misleading in that the process does require 860 watts per cubic meter to remove the dissolved solids. However, desalination is a reversible process; therefore, the energy used for removing the solids can, theoretically, be recovered.

In a thermal desalination system the "heat of vaporization" can be recovered in the condensation stage, referred to as the "heat of condensation."

The first law of thermodynamics states that the total energy of an isolated system is constant; energy can be transformed from one form to another, but cannot be created or destroyed.

For a thermal process to be effective the system must be isolated (insulated) so that minimum heat energy escapes the system. The thermal process does not require energy form changes and can extract dry solids from seawater.

For a filtration process to recover and reuse the energy would require transforming from one form of energy to another (e.g., electrical to pressure) resulting in high entropy. The process cannot extract dry solids from seawater.

Therefore, there is still a need to create an efficient desalination that results in operational cost equal to, or less than, conventional ground water supplies.

SUMMARY OF THE INVENTION

In one embodiment, the present invention is directed towards a desalination system for substantially increasing the efficiency of the distillation of ocean and brackish water by continuously reusing heat energy to reduce the overall energy requirements, comprised of basic assemblies, including an evaporation chamber, a vapor transfer assembly, and a condensing chamber, that are surrounded by a, double wall assembly comprised of a first and second wall, wherein the space between the first and second wall is placed under low partial vacuum to maintain very low conductive and convection heat loss. An external water heater source feeds heated input sea water into the evaporation chamber through a plurality of spray nozzles, which transforms the sea water into droplet-mist that flash vaporize into a density-saturated vapor. The density-saturated vapor is drawn into the condenser by a vacuum pump assembly. The solids that remain from the flash vaporization fall to the bottom of the evaporation chamber. Any droplet-mist that does not vaporize is prevented from entering the vapor transfer assembly by a demister. The density-saturated vapor is discharged through the vacuum pump assembly and is forced into the condensing chamber located below the vacuum pump assembly. The condenser is then continuously cooled by intake sea water distributed by a ratio valve through an intake channel into a heat-exchanger port. This condenses the liquid-vapor into pure liquid distilled water. Concurrently, the intake sea water is heated by its contact with the heat exchanger. The heated intake sea water is then transferred to the external water heater source through a vacuum insulated channel to be fed back into the evaporation chamber.

The ratio valve also distributes intake sea water to the bottom of be evaporation chamber to cool the solids that fall and collect at the bottom. This is accomplished by distributing the intake sea water through a first chamber port into cooling coils to cool the solids. The intake sea water is heated in the process, and is transferred back to the external water heater source through a vacuum insulated channel. The preheated intake sea water is then fed into the evaporation chamber.

In another embodiment, the desalination system similarly uses a thermal process that converts saltwater, such as seawater or brackish water, into fresh distilled water. The system introduces methods for continually removing the dissolved solid byproducts that may be processed as sea-salt. The output is 100% potable and dry solids, with zero liquid discharge. This feature eliminates the environmental problem of discharging waste brine solution back into the ocean.

The desalination system efficiently vaporizes saltwater, thereby extracting the dry solids from the water and condensing the water vapor back into liquid form to create distilled water by reusing retained heat energy multiple times. The only energy input, after startup stabilization, is the energy required to compensate for the small heat energy loss to the atmosphere, through a vacuum insulation double wall, the drive motor of the vapor transfer assembly, and instrumentation.

The desalination system recovers the heat energy used in the vaporization process. Heat loss in the distillation system is essentially eliminated, reducing energy requirements to approximately 1.2 kWh/cubic meter (264 gallons) of fresh water, far below energy requirements used in current technologies.

Heat energy used to evaporate water (heat of vaporization) is recovered in the condensing phase (heat of condensation) and used to preheat the incoming seawater. This process is continuously repeated reusing the heat energy multiple times. The process requires that very little heat energy, above the input seawater ambient temperature, be allowed to exit the system.

In addition, the desalination system is designed with components that minimize the total outside system surface area so as to minimize heat loss to the atmosphere. Also, the system employs vacuum insulation via a double-wall assembly that surrounds the components of the desalination system to prevent heat energy, greater than a few degrees above ambient seawater temperature, from exiting the system. Insulation is provided by a deep partial vacuum created between the first and second walls of the double-wall assembly.

The system may be designed with spray nozzles that transform the fluid water into a fine mist of water droplets with droplet sizes below fifty microns. Droplet surface area and temperature are key issues in the vaporization stage. Evaporation occurs first at the liquid surface causing the remaining liquid to be more concentrated, which increases the boiling point and energy required to vaporize the remaining liquid. Therefore, it is important to increase surface area as much as possible.

Using spray nozzles to break the liquid into small droplets greatly increases the surface area. The large surface area decreases the time and energy for evaporation.

For example, a one-inch diameter (volume=0.523 cubic inches) drop of water has a surface area of 3.14 square inches.

If the same volume is parted into 10 micron (3.937E-04 inch) diameter droplets (volume=3.19E-11 cubic inch), the total number of droplets would be over 16 billion with a total liquid surface area of 7,980 square inches.

The condenser may be a specially designed spiral heat exchanger that uses the inside surface of the second wall of the double-wall assembly as part of the outside spiral of the condenser. Intake seawater ambient temperature is introduced to the outside spiral that lowers the temperature of the vacuum insulation second wall and transfers the heat energy back into a vaporizing chamber. This arrangement reduces the temperature of the vacuum insulated second wall, and the energy that would normally escape to the atmosphere through the vacuum insulation.

The primary objective of the present invention is to provide a means of increasing the overall efficiency of large scale desalination systems by significantly reducing the energy input requirement, and make desalination affordable. Another object of the invention is to provide a means for using the ambient temperatures of seawater and air to continually transfer The heat energy, from the outer perimeters of the system, back into the, centrally located, evaporation chamber. Another object of the invention is to provide a means of using evacuated space (partial vacuum) insulation that prevents heat from escaping into the atmosphere. The invention also includes means for reusing the heat energy repeatedly to preheat the incoming saltwater. The invention also provides a method for evaporating the heated saltwater into a density-saturated vapor. It also provides a means for condensing the vapor into fresh distilled water and capturing and re-using the heat-of-condensation to preheat the input saltwater. A further object of the invention is to provide means for separating the dissolved solids from the liquid water and still further means for continually removing the solids from the system without interruption. A further object of the invention is to provide means for removing the heat energy from the hot solids and reusing it to preheat the air flow as it enters the air heater, which provides heat to vaporize the droplet mist as it falls within the evaporation chamber. A further object of the invention is to provide means for eliminating the heat loss through the structural feed through of the vacuum insulated double wall.

Additional objects of the present invention will become better understood with reference to the description and claims.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
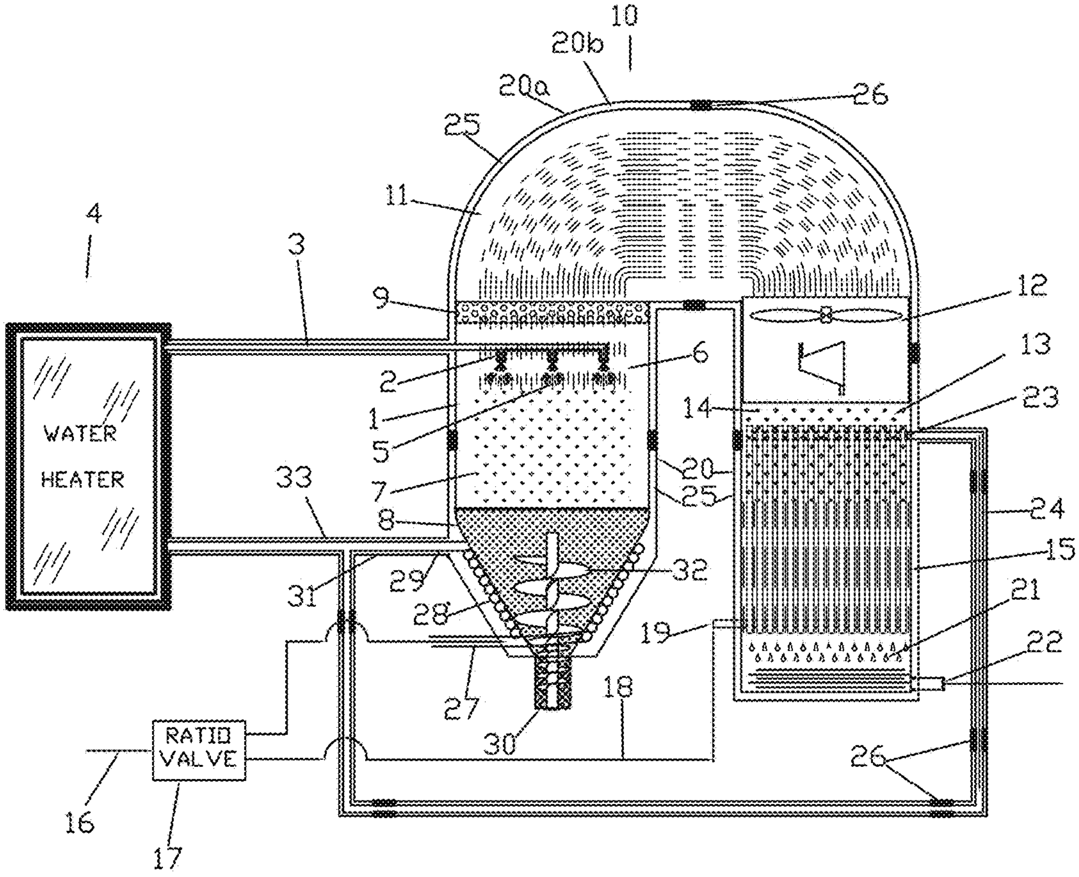
FIG. 1 is a diagrammatic representation of an elevation view of a cross-section of an embodiment of a desalination system incorporating features of the present invention.

Referring to the drawings, FIG. 1 is a representative view of an embodiment of the desalination system 10 showing all of the basic assemblies and plumbing surrounded by a first wall 20*a* and secondary wall 20*b* of a double wall. The space 25 between the first wall 20*a* and the secondary wall 20*b* is under low partial vacuum, between 0.001 and 1 Torr (0.1333 to 133.3 Pascal), thereby maintaining very low conductive and convection heat loss. The space 25 can be partially or totally filled with an insulation material 26 for structural support. Perlite is used for the structural support in the preferred embodiments as it exhibits a thermal conductivity of 0.031 W/m*K that improves to 0.00137 W/m*K under partial vacuum.

Figure 3:
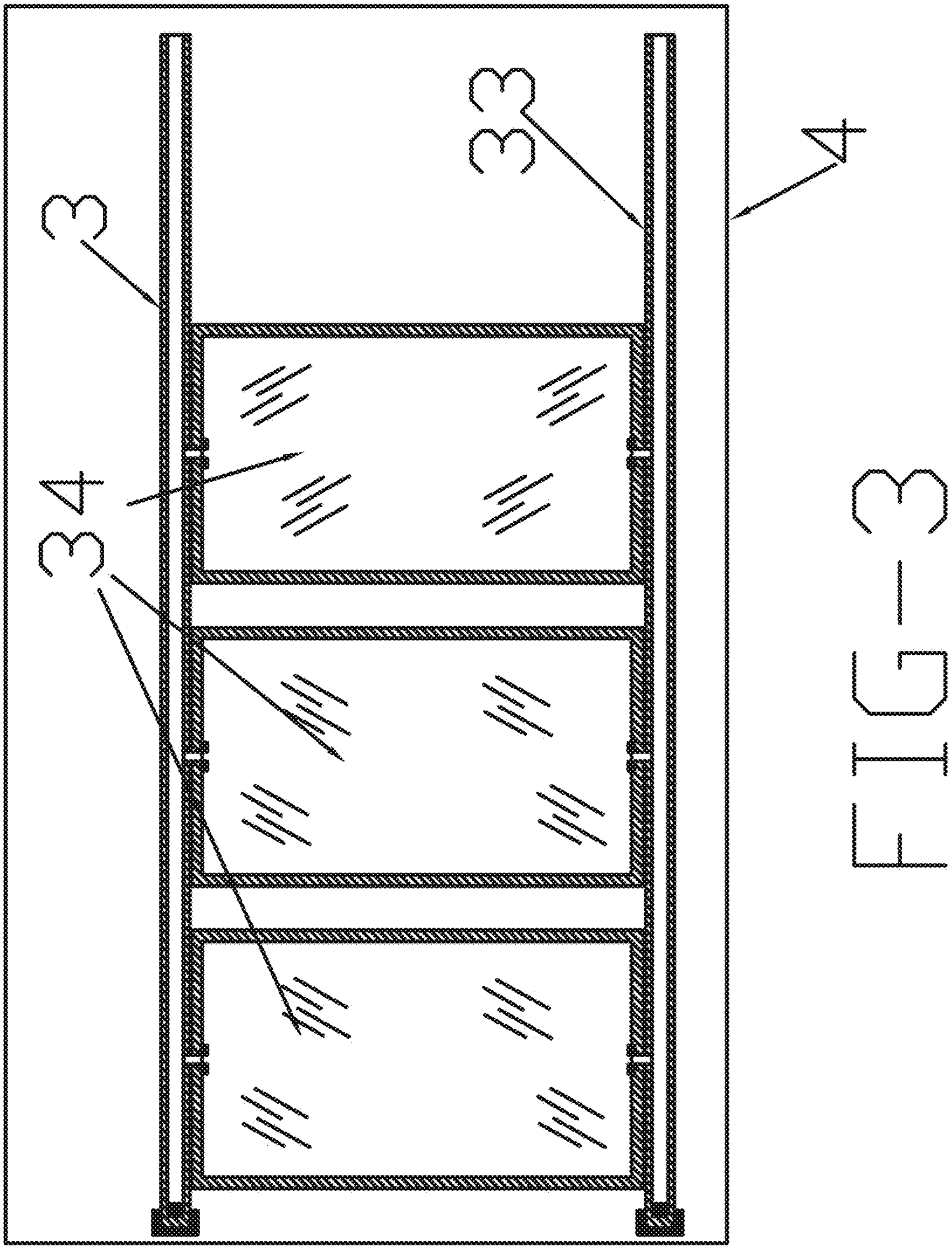
FIG. 3 is a diagrammatic representation of a solar collector incorporating features of the present invention.

Still referring to FIG. 1, the assemblies include an evaporation chamber 1 that houses a plurality of spray nozzles 2 being fed heated input sea water 3 from an external water heater source 4. The preferred external water heater source 4 is a solar collector field (see FIG. 3), although fossil fuel energy source can be used especially in poor solar areas. The plurality of spray nozzles 2 are designed to provide fine droplet-mist 5 that flash vaporize into a density-saturated vapor 6. The evaporation chamber 1 is under partial vacuum generated by a vacuum pump-assembly 12. The vacuum pump assembly 12 is designed to insure that the pressure in the evaporation chamber 1 is well below the saturation vapor pressure over the range of input water 3 temperature. As the droplet-mist 5 vaporize, the remaining solids 7, being heavier than the surrounding density-saturated vapor 6, fall and collect at the bottom 8 of the evaporation chamber 1.

Figure 2:
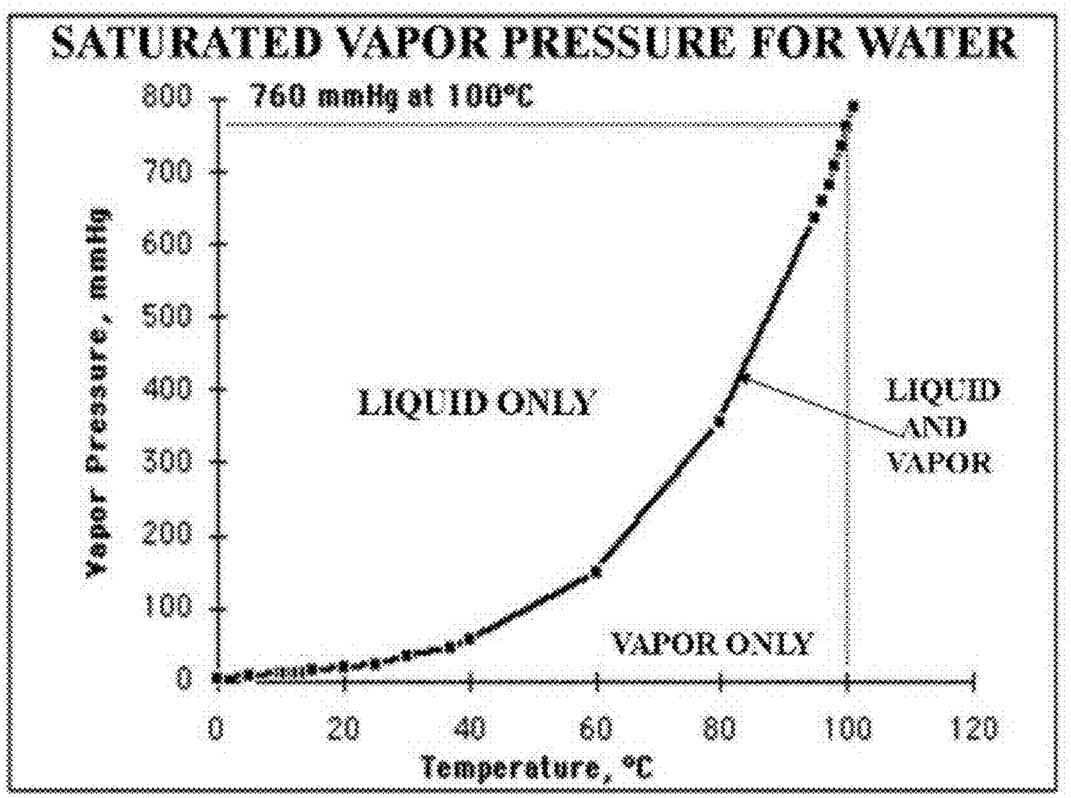
FIG. 2 is a graphic view of a saturated vapor pressure curve for water.

Referring to FIG. 2, FIG. 2 is a graphical view of the "Vapor Pressure Curve of Water" showing vapor pressure and the corresponding temperature at which water vapor and liquid can coexist in equilibrium. At any given temperature on the curve, if the pressure is increased, the water can exist only as liquid. If the pressure is decreased, the water can exist only as vapor.

Now referring back to FIG. 1, so long as the temperature of the fine droplet-mist 5 is sufficiently high and the pressure in the evaporation chamber 1 is sufficiently low, the fine droplet-mist 5 will become a density-saturated vapor 6 leaving all remaining solids 7 (e.g., previously dissolved salt) behind. Directly above the plurality of spray nozzles 2 is the demister 9 which prevents the fine droplet-mist 5 from entering the vapor transfer assembly 11. The vapor transfer assembly 11 connects the top of the evaporation chamber 1 to the vacuum pump assembly 12 and provides a means for the density-saturated vapor 6 to transfer between the evaporation chamber 1 and the vacuum pump assembly 12. The density-saturated vapor 6 is drawn through the demister 9 by the vacuum pump assembly 12. A condensing chamber 13 is mounted below the vacuum pump assembly 12. The discharge output of the vacuum pump assembly 12 provides a pressure increase within the condensing chamber 13. The increased pressure forces the density-saturated vapor 6 into the state of vapor-liquid 14 and to move into a heat exchanger 15. The heat-exchanger 15 is continually cooled by the intake sea water (sea water input) 16 that is distributed by a ratio valve 17 through an intake channel 18 into a heat-exchanger port 19. The liquid-vapor 14 is cooled within the heat-exchanger 15 and further condenses into pure liquid water 21. The pure liquid water 21 exits the heat exchanger 15 at a temperature near the intake sea water 16 temperature through a condensing chamber port 22. The intake sea water 16 that s the heat-exchanger 15 through the ratio valve 17, intake channel 18, and heat-exchanger port 19 is heated by the heat-of-condensation of vapor-liquid 14 and is transferred from the heat-exchanger exit 23 through a vacuum insulated channel 24 as preheated input seawater to the external water heater source 4 (solar collector field). Intake sea water 16 is also distributed by the ratio valve 17 through a first bottom chamber port 27 into cooling coils 28 and cools the remaining solids 7 that collect at the bottom 8 of the evaporation chamber. As the intake sea water 16 is heated by the remaining solids 7, it exists the cooling coils 28 through a second bottom chamber port 29 and is transferred through a vacuum insulated channel 31 as preheated input sea water 33 to the external water heater source 4. The remaining solids 7 are periodically or continuously removed from the bottom 8 of the evaporation chamber through an outlet 30 by an auger 32. The ratio valve 17 adjusts the intake sea water 16 flow rate through the heat-exchanger and cooling coils 28 to insure minimum heat loss and maximum heat recovery. The bottom 8 of the evaporation chamber, including the auger 32, may be modified or changed to other methods of removing remaining solids 7 depending on the quality and filtering method of the intake sea water 16. If the sea water is pumped from beach wells or sub-surface intakes that remove all un-dissolved solids, the remaining solids 7 may be used for sea salt. The beach wells or sub-surface intakes will also greatly reduce the intake of solvents that have boiling points lower than water that could potentially contaminate the distilled water. In the preferred embodiment, the heat exchanger 15 is a Plate Heat Exchanger (PHE) as opposed to other types for overall performance and maintenance. The type of vacuum pump assembly 12 is also optional, depending on the size (cubic meters per day) of the overall system and where it is to be located. Flash evaporation is used in the preferred embodiment; however, it is apparent that almost any type of heat base desalination could be greatly improved by using vacuum insulation.

The following description describes another embodiment of the present invention. Components that are similarly named or perform similar functions may be interchangeable and share similar features in both embodiments regardless of the reference number designations. With references to FIG. 4, the desalination system 100 of the present invention substantially increases the efficiency of the distillation of contaminated water, such as ocean and brackish water, by continuously reusing heat energy to reduce the overall energy requirements. The desalination system 100 comprises a double-wall assembly 101 housing an evaporation chamber 500 a vapor transfer assembly 400, and a condenser 300 (also referred to as condensing chamber). Saltwater is taken through the double-wall assembly 101 where it is heated and vaporized in the evaporation chamber 500, and transferred to the condenser 300 by the vapor transfer assembly 400, where the vapor condenses into distilled water, leaving the extracted dry solids 902 that continue to fall within the evaporation chamber 500.

The double-wall assembly 101 comprises a first (outer) wall 102 and a second (inner) wall 103 that is surrounded by the first wall 102, thereby defining a space 104 between the first and second walls 102, 103. The space 104 may be under low partial vacuum to maintain very low conductive and convection heat energy loss. The first wall 102 is exposed to the environment. The second wall 103 may be substantially coextensive with the first wall 102 to create the space 104 in between the first and second walls 102, 103.

Preferably, a deep partial vacuum is provided within the space 104 between the first wall 102 and second wall 103. The double-wall assembly 101 surrounds the components of the desalination system 100. In some embodiments, the space 104 between the first and second walls 102, 103 may include an insulator 105. Preferably, the insulator 105 is a structural insulation. For clarity, the insulator 105 is shown in a small portion of the space 104. However, the insulator 105 can occupy up to the entire space 104. In the preferred embodiment, perlite is used for the insulator 105 as it exhibits a thermal conductivity of approximately 0.031 W/m*K that improves to 0.00137 W/m*K under low partial vacuum, and may provide structural support.

The first wall 102 and the second wall 103 of the double wall 101 are connected for structural support that also provides an opening 106.

A common problem with vacuum insulation is the thermally conductive path that is created by the necessary structural support connecting the double walls that maintain positioning of the two walls relative to each other, and to provide a passageway for accessibility to the internal cavity of the double wall.

The double wall assembly 101 has only one opening 106 at one end of the system 100, thereby creating a passageway from the outside of the system 100 to the internal cavity defined by the internal surface of the second wall 103. Preferably, the opening 106 is created at the bottom end of the system 100.

Figure 4:
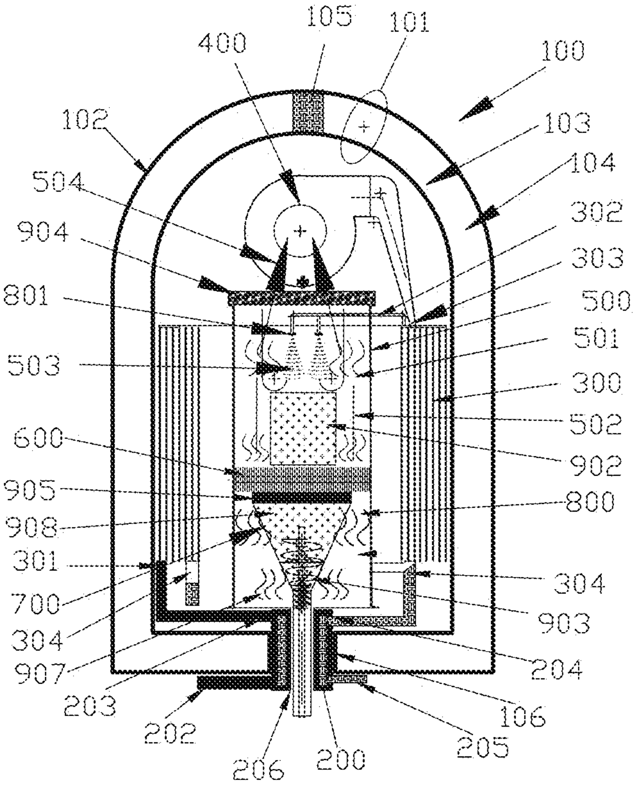
FIG. 4 is a diagrammatic representation of an elevation view of a cross-section of a second embodiment of the desalination system.
Figure 5:
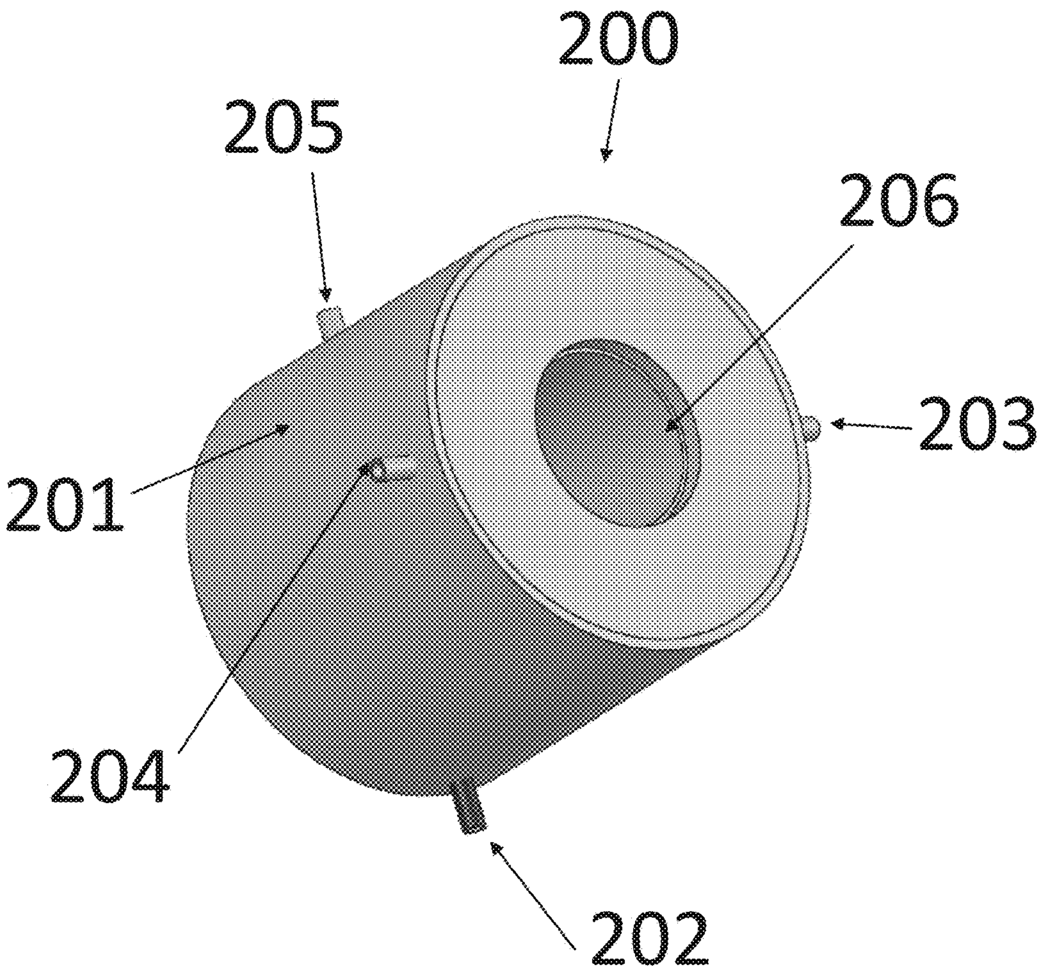
FIG. 5 is a perspective view of a feed-through assembly of the second embodiment.
Figure 5A:
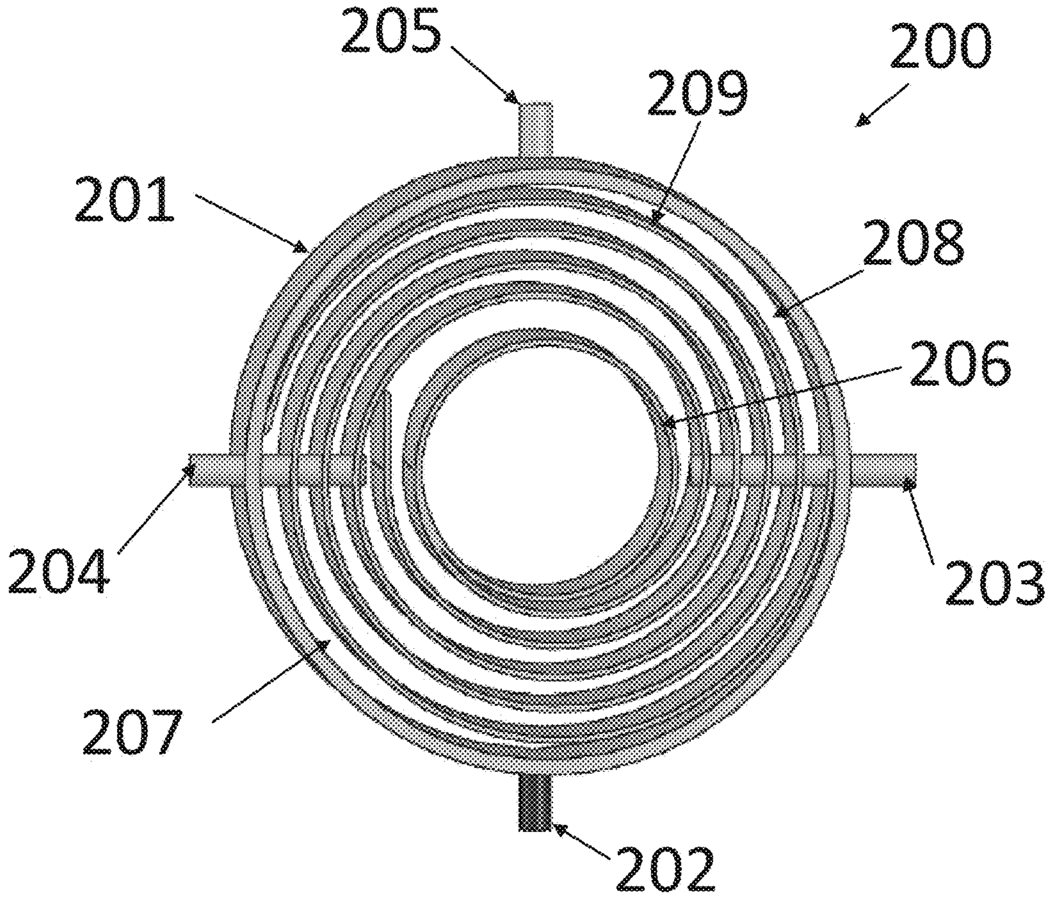
FIG. 5A is a plan view of a feed-through assembly with the top and bottom covers removed.
Figure 5B:
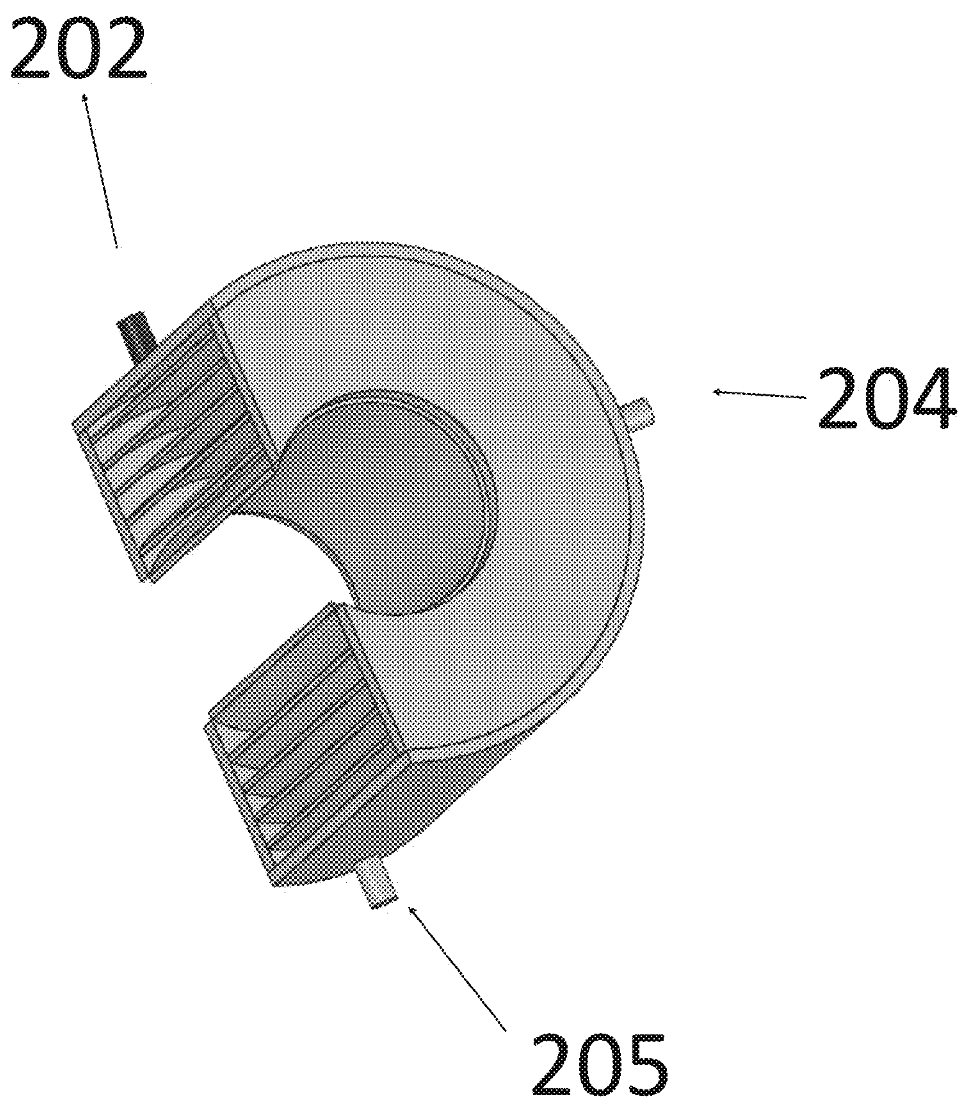
FIG. 5B is a perspective view of a cross section of a feed-through assembly.
Figure 6:
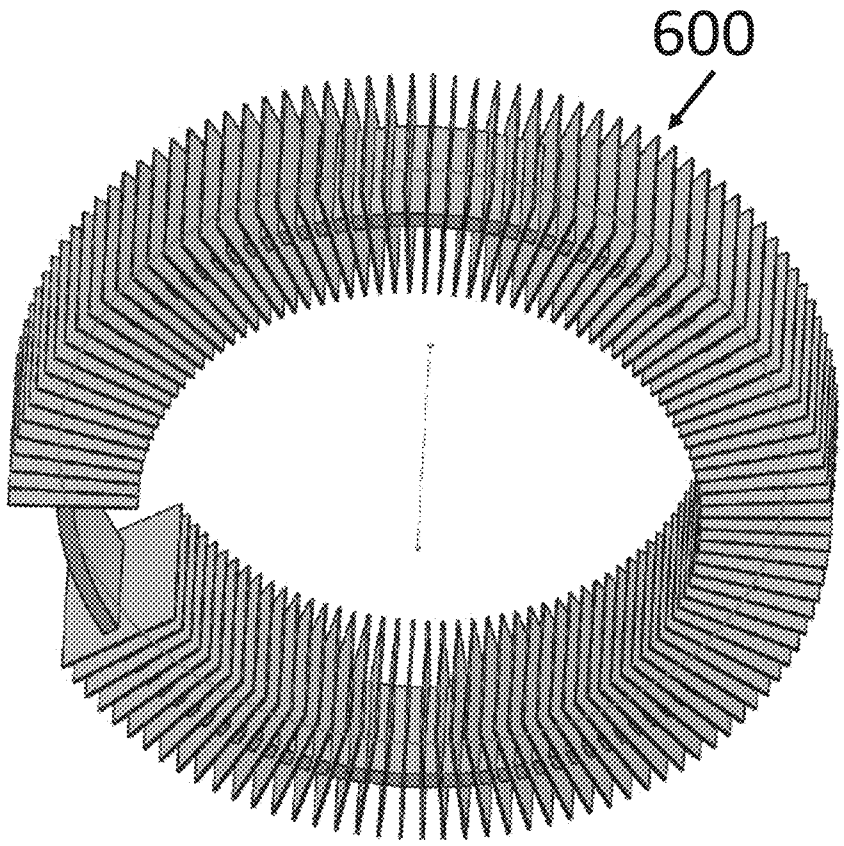
FIG. 6 is a perspective view of a square toroid shaped heater.
Figure 7:
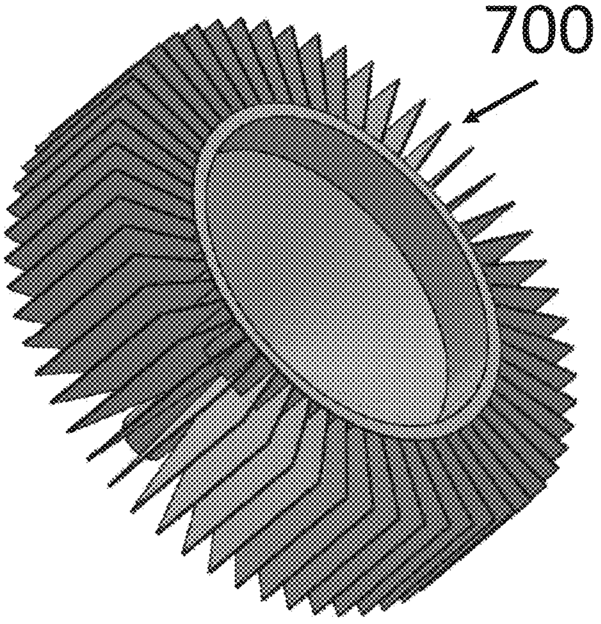
FIG. 7 is a perspective view of a finned funnel assembly.

Refer to FIG. 4, FIGS. 5, and 5A. To reduce thermal conductive and convective heat loss, through the opening 106 is a feed-through assembly 200 that allows saltwater to enter the system and distilled water to be collected and transferred out of the system. In some embodiments, as shown in FIG. 5A, the feed-through assembly 200 may comprises a spiral type heat exchanger. The outer cylinder wall 201 may comprise an intake port 202 to take in the saltwater, and an exit port 203 in fluid connection with the intake port 202 to deliver the saltwater into the condenser assembly 300 and a receiver port 204 to receive distilled water that has been processed by the system 100, and a distilled water outlet port 205 operatively connected to the receiver port 204 to return distilled water for collection. The distilled water may be at or near ambient temperatures. An inner cylinder, central channel 206, may define a passageway for introducing ambient air 907 into evaporation chamber 500. The central channel 206 may also be used as an exit port for the dry solid transfer auger 903 to remove dry solids from the evaporation chamber 500, and route wiring and cable into the system 100, without excessive heat loss.

Refer to FIG. 4, FIG. 5A. As the feed-through assembly 200 is mounted within the opening 106 of the double wall assembly 101, the outer cylinder wall 201 of the feed-through assembly 200 makes contact with the opening 106 wall of the double wall assembly 101. Ambient temperature seawater flows through intake port 202 of the feed-through assembly 200 into the outer first spiral of channel 207 that is in direct contact with the outer wall 201. The outer wall 201 is in contact with the structural wall 106 of the double wall assembly 101. The heat energy above ambient temperature that normally flows through opening 106 of the double wall assembly 101, is transferred to the seawater. The second spiral channel 208 and the first spiral channel 207 are thermally connected by a single spiral plate 209. Distilled water from the condenser 300 flows, though port 204, into the inner second spiral channel 208 of the feed-through-assembly 200. The heat energy above ambient temperature that remains from the condensing process is transferred to the seawater and back into the condenser assembly 300. Surrounding the funnel exit passageway (inner channel 206) is an open passageway for ambient temperature air, that is drawn into the system by the vapor transfer assembly 400 that also provides additional heat exchange for any remaining heat, from the dry solids 908, and transfers it back into the internal system.

Figure 8:
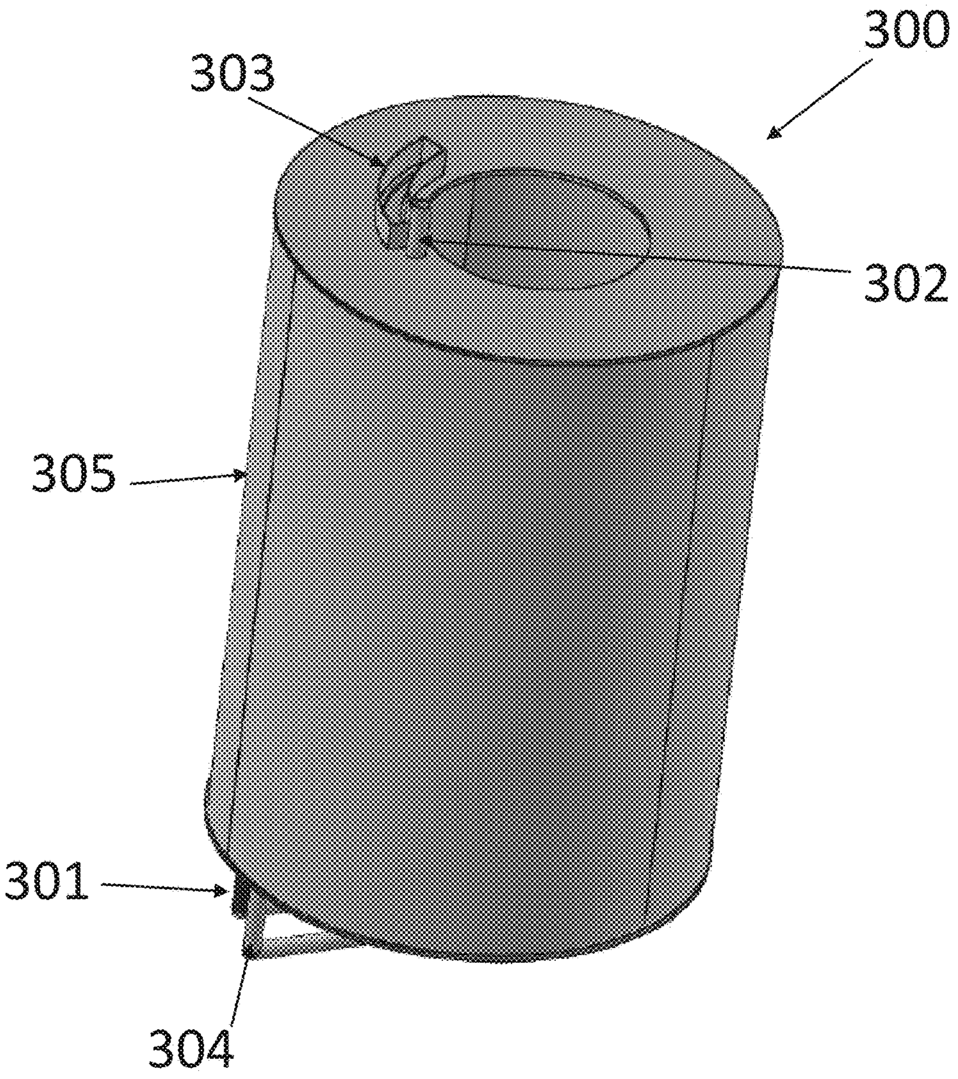
FIG. 8 is a perspective view of a condenser assembly of the second embodiment.
Figure 8A:
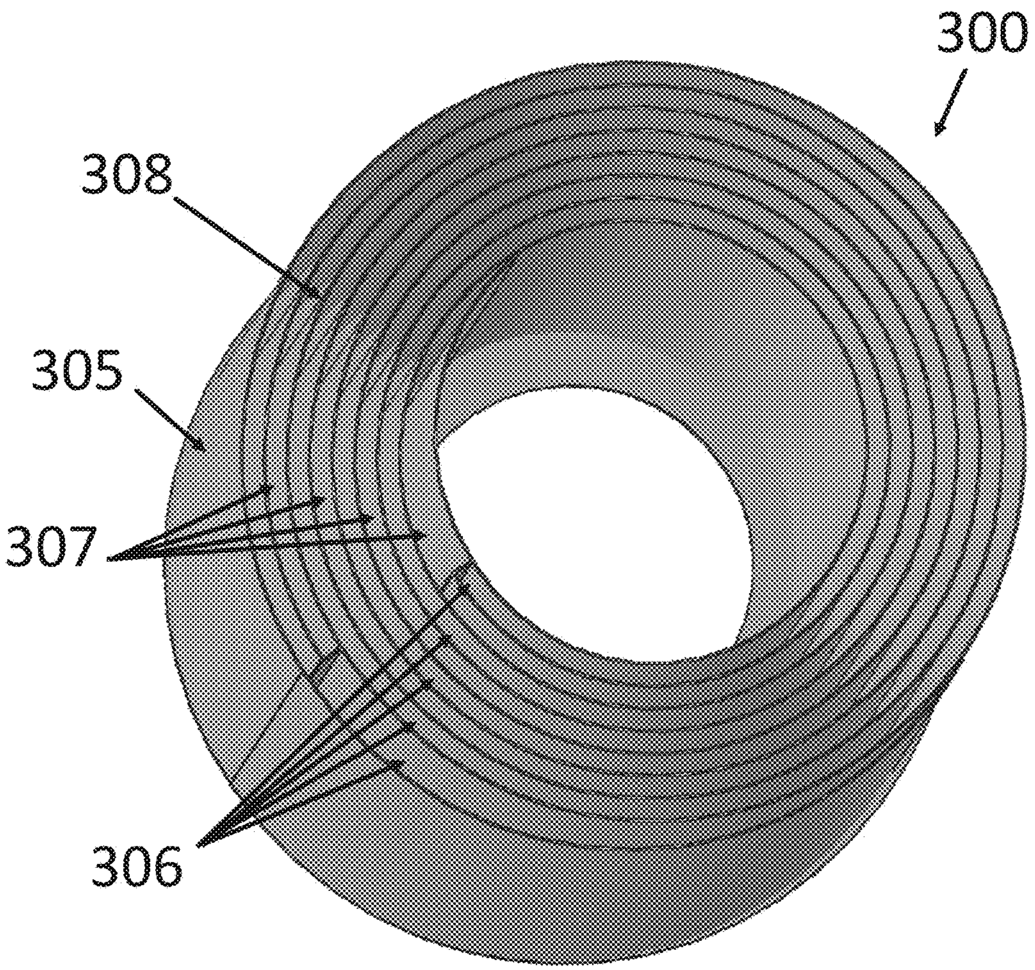
FIG. 8A is a perspective view of a cross section of the condenser assembly.

Refer to FIG. 4, FIG. 5 and FIG. 8. Seawater, under pressure, flows through the intake port 202 and exit port 203 of feed-through assembly 200 into the intake port 301 of condenser 300. The spiral condenser 300 surrounds the evaporation chamber 500. The outer wall 305 of the condenser 300 is in direct contact with the inside of the second wall 103 of the vacuum insulated double wall 101. The input seawater adsorbs heat, from the inside second wall 103, of the double wall assembly 101 and transfers it into the evaporation chamber 500, that reduces the temperature difference ($\Delta t$) across the vacuum insulated double wall 101, thereby substantially reducing the heat energy loss to atmosphere and simultaneously preheats the input seawater. This arrangement also reduces the overall system size requirement and the surface area, which substantially reduces heat energy loss and increases system efficiency.

Refer to FIG. 4, FIG. 5, FIG. 8, and FIG. 8A. Seawater inters the condenser 300 through port 301 and flows through the outer first spiral channel 306 and connects with outlet port 302. The condenser 300 provides an arc shaped vapor intake port 303 that connects with the second spiral channel 307 and is separated from channel 306 by a single spiral wall 308. The wall 308 provides a thermally conductive path for the high temperature vapor in channel 307 to be transferred to the low temperature seawater in channel 306. The lower temperature in channel 307 results in condensing the vapor into liquid. The liquid distilled water continues to flow through channel 307 to outlet port 304 of condenser 300 into port 204 of the feed through assembly 200 and exits the system through port 205 of the feed through assembly 200. The preheated seawater flows out of the condenser 300 through outlet 302 and enters the evaporation chamber 500 through the nozzle assembly 801.

Figure 4A:
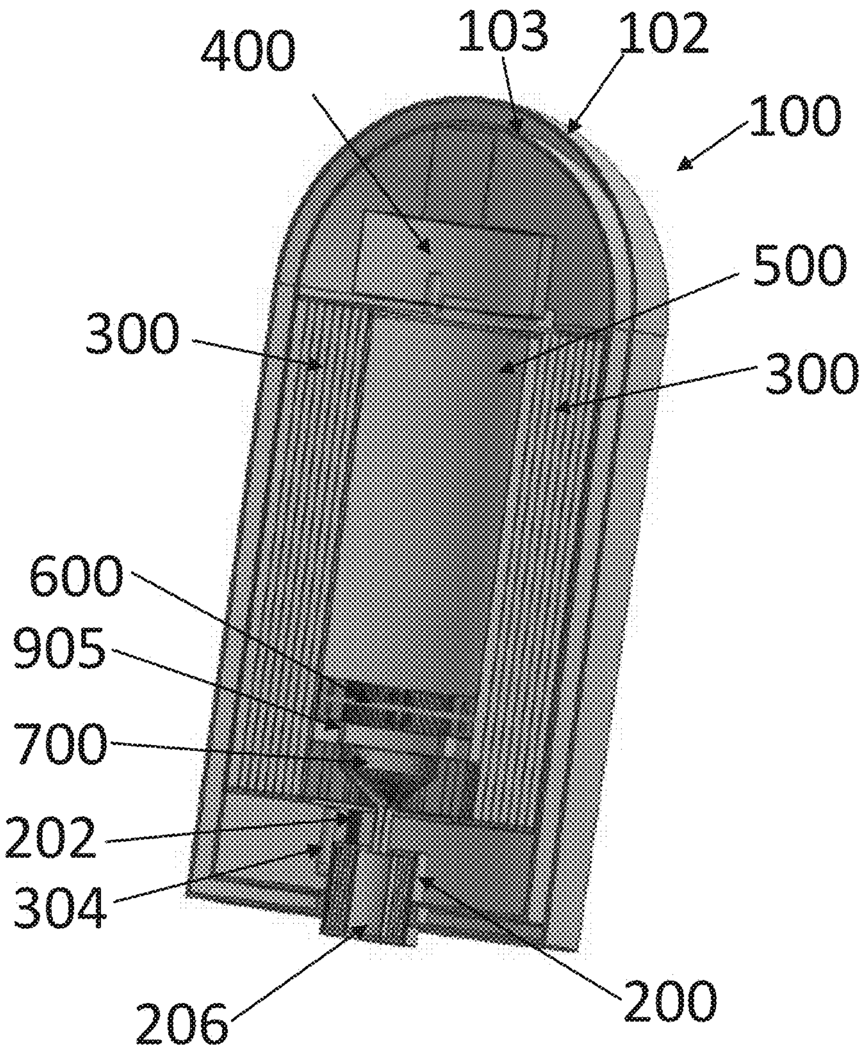
FIG. 4A is a perspective view of a cross section of the second embodiment.

Refer to FIG. 4, FIG. 4A. The nozzle assembly 801 is designed to convert the preheated saltwater into a fine droplet-mist 503. The preheated mist 503 is further heated by the hot upward airflow 502 and vaporizes, leaving the dry solid 908 that continue to fall. The vapor is forced upward by the airflow 502. The vapor transfer assembly 400 mounted above the vaporization chamber 500 provides the airflow 502 and a square-toroid-shaped heater 600, mounted near the lower midsection of the evaporation chamber 500 provides heat for the airflow 502.

As the droplet-mist 503 vaporizes into the density saturated vapor 501, that is drawn upward by the air stream 504 and the dry solids 902 are extracted from the mist 503 and fall towards the bottom of the evaporation chamber 500. Due to the toroid shape of the heater 600, the air stream 800 directs the falling dry solids 902 toward the center of the evaporation chamber 500.

The dry solids 902 continue to fall through the center opening of the heater 600 and into a finned funnel assembly 700 where the dry solids 908 are cooled by the ambient temperature air flow 800 flowing through the feed-through assembly 200. As the hot dry solids 908 fall towards the bottom of the evaporation chamber 500, the hot dry solids 908 transfers heat to the cool air flow 907 being drawn into the system 100 through the central channel 206 of feed-through assembly 200. The cool dry solids 908 continue to fall through the central channel 206 of the feedthrough assembly 200 where they are further cooled by the saltwater flowing through the intake port 202 of the feed-through assembly 200 before exiting the system 100.

In some embodiments, a transfer auger 903 may be provided to facilitate movement of the dry solids 908. Whether a transfer auger 903 is required will depend upon the components of the dry solids 908. In most environments the dry solids 908 will free flow without the need of the transfer auger 903.

The vapor 501 is drawn upward through a demister 904 by the vapor transfer assembly 400 and forced into the inner passageway 307 of the condenser 300 where the vapor is condensed into pure distilled liquid water 304 at near ambient temperature. The demister 904 prevents droplets that have not yet been vaporized from entering into the condenser 300. The distilled water 304 flows from the condenser 300 and enters the feed-through assembly 200 through receiver port 204 where it is further cooled by the inflowing seawater, and exits through the exit port 205 of the feed-through assembly 200.

A structural insulation assembly 905 is positioned between the heater 600 and the funnel 700 that provides a low thermally conductive path from the heater 600 to the dry solids 908 that have fallen into the funnel 700.

When it is desirable to use solar energy instead of or in combination with electrical power, the square toroid shaped air heater 600 may be replaced with a similar shaped heater that uses hot water or steam as an energy source.

Although particular embodiments of the present invention have been described in the foregoing description, it is to be understood that the present invention is not to be limited to just the embodiments disclosed, but that they are capable of numerous rearrangements, modifications and substitutions without departing from the description herein.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A desalination system for substantially increasing the efficiency of the distillation of seawater, comprising:

a double-wall assembly, comprising a first wall exposed to an environment and a second wall internal to and coextensive with the first wall to create a space in between the first wall and the second wall, wherein the space is a low partial vacuum and filled with a structural insulation, wherein the second wall defines an internal cavity, wherein the double-wall assembly defines a single opening into the internal cavity located at a first end of the desalination system;

a feed-through assembly mounted within the opening of the double-wall assembly, the feed-through assembly comprising an intake port to take in the seawater, an exit port in fluid connection with the intake port to deliver the seawater into the internal cavity, a receiver port to receive distilled water, a distilled water outlet port operatively connected to the receiver port to return distilled water for collection, and a central channel for introducing ambient air into the internal cavity;

a spiral condensing chamber, wherein the spiral condensing chamber is a tubular structure defining two substantially concentric and parallel spiral channels with a single wall separation, wherein the seawater flows through an outer spiral channel and uses heat of vaporization to preheat the seawater and wherein vaporized water flows through an inner spiral channel and is condensed by heat of condensation;

a plurality of spray nozzles operatively connected to the outer spiral channel of the spiral condensing chamber, wherein, the plurality of spray nozzles receives the preheated seawater and sprays the preheated seawater into fine droplet mist;

an evaporation chamber surrounded by the spiral condensing chamber, the evaporation chamber receiving the fine droplet mist from the plurality spray nozzles, wherein the evaporation chamber vaporizes the fine droplet mist into a vapor, separating dry solids from the fine droplet mist;

a finned toroid-shaped air heater positioned in the evaporation chamber below the plurality of spray nozzles to heat ambient air within the evaporation chamber to vaporize the fine droplet mist, the finned toroid-shaped air heater operatively connected to a funnel to capture the dry solids, wherein the dry solids pre-heats ambient air as the pre-heated ambient air moves towards the finned toroid-shaped air heater;

a vapor transfer assembly creating airflow of the pre-heated ambient air to draw the pre-heated ambient air into the finned toroid-shaped air heater to further heat the pre-heated ambient air and vaporize the fine droplet mist into a vapor, wherein the vapor transfer assembly causes the vapor to pass through a demister into the vapor transfer assembly, and into the internal passageway of the spiral condensing chamber where the vapor is condensed into distilled water and transferred to the receiver port; and a funnel assembly located at the bottom of the evaporation chamber and operatively connected to the feed-through assembly, thereby providing an exit for the dry solids.

2. The desalination system of claim 1, wherein the finned toroid shaped air heater uses electric power as an energy source.

3. The desalination system of claim 1, wherein the funnel assembly comprises a transfer auger to facilitate movement of the dry solids.

4. The desalination system of claim 1, wherein the spiral condensing chamber comprises an inside spiral parallel to and surrounding a wall defining the evaporation chamber, and an outside spiral parallel to and in contact with the second wall of the double-wall assembly.

5. A desalination system for substantially increasing the efficiency of distillation of saltwater, comprising:

a double-wall assembly to minimize heat from escaping the system, the double-wall assembly comprising an opening;

a feed-through assembly mounted within the opening, the feed-through assembly comprising an intake port to draw in the saltwater, and an exit port to deliver the saltwater inside the desalination system, wherein the feed-through assembly further comprises a central channel for introducing ambient air into the desalination system;

a condensing chamber defining two substantially parallel spiral channels wherein the saltwater is delivered to an outer channel of the condensing chamber;

an evaporation chamber operatively connected to the outer channel of the condensing chamber to receive the saltwater from the condensing chamber;

an air heater contained in the evaporation chamber to heat the ambient air drawn in through the feed-through assembly to heat the saltwater sufficiently to convert the saltwater into a vapor and remove dry solids from the saltwater;

a vapor transfer assembly to create airflow to draw in the vapor and transfer the vapor to an inner passageway of the condensing chamber while the dry solids fall towards the feed-through assembly, wherein the condensing chamber condenses the vapor into distilled water.

6. The desalination system of claim 5, wherein the double-wall assembly comprises a first wall exposed to an environment and a second wall internal to and coextensive with the first wall to create a space in between the first wall and the second wall, wherein the space is a low partial vacuum.

7. The desalination system of claim 6, wherein the space is at least partially filled with a structural insulation.

8. The desalination system of claim 7, wherein the structural insulation is perlite.

9. The desalination system of claim 5, wherein the feed-through assembly further comprises a receiver port to receive the distilled water, and an outlet port operatively connected to the receiver port to return distilled water for collection.

10. The desalination system of claim 5, wherein the condensing chamber is spiral in shape and surrounds the evaporation chamber.

11. The desalination system of claim 10, wherein the condensing chamber comprises an inner spiral parallel to and surrounding a wall defining the evaporation chamber, and the outer spiral is parallel to and in contact with an inner wall of the double-wall assembly.

12. The desalination system of claim 5, wherein the evaporation chamber houses a plurality of spray nozzles receiving the saltwater from the outer channel of the condensing chamber to convert the saltwater into a mist to facilitate vaporization of the saltwater.

13. The desalination system of claim 12, wherein the evaporation chamber houses a demister directly above the plurality of spray nozzles.

14. The desalination system of claim 5, wherein the air heater is a finned toroid-shaped air heater positioned in the evaporation chamber.

15. The desalination system of claim 14, wherein the air heater is operatively connected to a funnel to capture the dry solids, wherein the dry solids pre-heat ambient air as the pre-heated ambient air moves towards the air heater.

16. The desalination system of claim 15, wherein the air heater uses electric power as an energy source.

17. The desalination system of claim 5, wherein the evaporation chamber is centrally located within the desalination system, and wherein saltwater is introduced through the outer channel of the condensing chamber, that absorbs heat energy that normally transfers from the centrally located evaporation chamber, through thermally conductive and convective pathways, to the outer perimeters of the system, and transfers it back into the centrally located evaporation chamber, whereby seawater is desalinated.

* * * * *